United States Patent
Jin et al.

(10) Patent No.: US 6,658,505 B2
(45) Date of Patent: Dec. 2, 2003

(54) SYSTEM AND METHOD FOR CHECKING BITS IN A BUFFER WITH MULTIPLE ENTRIES

(75) Inventors: Daming Jin, Irvine, CA (US); Timothy C. Fischer, Berthoud, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 323 days.

(21) Appl. No.: 09/874,711

(22) Filed: Jun. 5, 2001

(65) Prior Publication Data

US 2002/0184414 A1 Dec. 5, 2002

(51) Int. Cl.[7] .............................................. G06F 13/00
(52) U.S. Cl. ........................ 710/52; 711/114; 711/118; 708/490
(58) Field of Search .............. 710/52–57; 711/118–146; 708/490, 505

(56) References Cited

U.S. PATENT DOCUMENTS

| | | | | |
|---|---|---|---|---|
| 4,332,010 A | * | 5/1982 | Messina et al. ................. | 711/3 |
| 4,878,221 A | * | 10/1989 | Shimada ....................... | 714/794 |
| 5,107,457 A | * | 4/1992 | Hayes et al. .................. | 711/132 |
| 5,287,512 A | * | 2/1994 | Ellis ............................ | 711/144 |
| 5,530,941 A | * | 6/1996 | Weisser et al. .............. | 711/151 |
| 5,684,971 A | * | 11/1997 | Martell et al. ............... | 712/217 |
| 5,751,994 A | * | 5/1998 | Weisser et al. .............. | 711/137 |
| 5,845,321 A | * | 12/1998 | Ito et al. ....................... | 711/118 |

OTHER PUBLICATIONS

T. Fischer, et al., 1998 IEEE International Solid–State Circuits Conference Digest of Technical Papers; "Design Tradeoffs in Stall–Control Circuits for 600MHz Instruction Queues", Feb., 1998; P.P. 232–233.
James A. Farrell, et al., 1997 Symposium on VLSI Circuits, "Issue Logic for a 600 MHz out–of–Order Execution Microprocessor", Jun. 12–14, 1997; P.P. 11–12.

* cited by examiner

Primary Examiner—Christopher B. Shin

(57) ABSTRACT

A computer hardware system is disclosed for determining during a single clock cycle whether a data buffer having a plurality of entries can accept additional data. The system has multiple stages, having one or more adders/encoders that process the data buffer entries' valid bits in parallel. Groups of entries are associated with first-stage adders/encoders. Valid bits and their complements for entries in each group are received into multiple first-stage adders that compute and output encoded values indicating the number of available entries within each group, or first-stage totals. The adders also encode the first-stage totals such that a saturated count corresponds to a pre-charged state of the first-stage adder. The first-stage totals are then sent to additional stages having adders/encoders that are substantially the same as the first-stage adders/encoders. The additional-stage adders combine the encoded totals from prior stages and determine whether the buffer has available entries.

20 Claims, 11 Drawing Sheets

SYSTEM AND METHOD FOR CHECKING BITS IN A BUFFER WITH MULTIPLE ENTRIES

FIELD OF INVENTION

The present invention relates generally to computer system hardware design. More particularly, it relates to a system and method for using valid bits to identify available space in an overflow buffer.

BACKGROUND

In the field of computer architecture, data received by a processor or controller may be stored in a cache array while it is processed. Data may be received by the controller on one or more data input signals in a more-or-less steady stream, in regular intervals. It may then be stored in a cache array until it can be processed. When the controller is done processing the data, it may be removed from the cache array, and its cache memory space becomes available for a new data element.

A problem occurs when the controller receives data faster than it processes the data. The cache array may become full or otherwise inaccessible temporarily, causing it to be unable to store additional incoming data temporarily. One method for handling this situation uses an overflow data buffer, or queue. When the cache array is full or inaccessible, incoming data is stored in the overflow buffer until the cache array becomes available. It is then removed from the overflow buffer and stored in the cache array.

In one embodiment, the overflow buffer may contain a plurality of data entries that can be accessed in any order. When the buffer is accessed randomly, it is desirable to have an efficient means of determining whether each entry has data stored to it. If an entry already has data stored, then the controller may not want to write a new entry over the existing data and instead may want to use an open entry, if one is available. Each data entry in the buffer may contain a valid bit that indicates whether the entry currently stores data. In one example, the valid bit may be set when data is stored to the buffer, and may be reset when data is removed from the buffer.

A further problem occurs when the cache array cannot be accessed immediately and the overflow buffer becomes full or otherwise inaccessible. The controller may be receiving data at a regular rate, and will need a location to store this incoming data, if the cache array is full or otherwise inaccessible. If the overflow buffer is also inaccessible, then it may be desirable to suspend the flow of incoming data until space becomes available. This is one purpose of the valid bit. Existing methods and systems check the valid bits to determine whether there are any empty entries in the buffer. Checking for open entries is difficult when the controller has more than one data input. For example, a particular controller may have two lines of incoming data and may use an overflow buffer having 24 entries. Before accepting data from the two inputs, the controller must determine whether there are at least two open entries in the over flow buffer.

Existing methods of checking the buffer require too much time. One such method uses a ripple adder to check the valid bits of each of the overflow entries. If it detects two or more open entries, then the controller receives the input. This method requires substantial time for the buffer check signal to ripple through logic gates for each of the 24 entries. The problem is exacerbated for buffers having more entries. The incoming data may be received at a faster rate than the time required by the ripple adder, in which case, these methods limit processing speed. For example, the inputs may receive data on every clock cycle, yet existing methods require more than one clock cycle to determine whether the buffer has sufficient space to receive the incoming data. As a result, existing systems limit the speed at which data can be received, or fail to indicate the current state of the buffer on the current clock cycle on which the buffer is queried. Systems that fail to determine buffer availability on the current clock cycle may require additional hardware to compensate for change in clock cycle.

What is needed is a method and system for more quickly determining whether an overflow buffer has room enough to receive additional data entries. In particular, what is needed is a method and system for determining whether or not a specified number of entries, or saturated count, are available in an overflow buffer having multiple entries.

SUMMARY OF INVENTION

A computer hardware system is disclosed for determining whether a data buffer having a plurality of entries can accept additional data. The system has multiple stages, having one or more adders/encoders that process the data buffer entries' valid bits in parallel. Entries are organized into groups and each group is associated with a first-stage adder/encoder. Valid bits and their complements for groups of entries are received into multiple first-stage adders that compute and output encoded values indicating the number of available entries within each group. Each adder calculates a partial sum of the total number of available entries in the buffer, which sum is referred to as a first-stage total. Each first-stage total represents the total number of available entries for the particular group or a saturated count if the total equals or exceeds a specified number of entries. Each first-stage adder/encoder then encodes its first-stage total for ease of processing. In one embodiment, in which the saturated count is two, the system determines whether two entries are available in the buffer, so the encoders indicate whether the first-stage total shows zero, one, or more than one available entry (that is, the saturated count).

The first-stage totals are then sent to a second stage having adders/encoders that are substantially the same as the first-stage adders/encoders. The second-stage adders receive the two-bit encoded first-stage totals and calculate a second-stage total that represents the number of available entries in the data buffer that are input into the second-stage adder. If the implementation has multiple second-stage adders/encoders, then the second-stage totals may be output to a third-stage adder/encoder that makes a final determination of whether the buffer has available room. Other implementations use additional stages.

In one embodiment, the buffer has twenty-four entries and the system is implemented to determine whether two or more of these entries are available. The number of available entries for which the system is searching is referred to as the saturated count. In one embodiment, the system determines whether or not the saturated count is reached and does not indicate the particular number of available entries above the saturated count. In the embodiment shown, six first-stage adders/encoders each receive four valid bits and their complements. Two second-stage adders/encoders each receive two-bit inputs from three first-stage adders, and a single third-stage adder receives two-bit inputs from the two second-stage adders. In one embodiment, the system analyzes the buffer during a single clock cycle so that the output of the final-stage adder reflects the current availability of the buffer. In one embodiment, the system uses a coding scheme that correlates a saturated count with a pre-charged state of the adder, such that the output of the adder does not transition from its pre-charged state when it receives a saturated count.

A method is also disclosed for analyzing a data buffer to determine whether a data buffer having a plurality of entries can accept additional entries. Groups of valid bits and their complements are analyzed in parallel by multiple first-stage adders to determine the number of available buffer entries in the group considered, or first-stage total. The first-stage total is encoded in a two-bit code and sent to a second-stage adder that sums the first-stage totals from two or more first-stage adders and outputs an encoded second-stage total representing the sum of the first-stage totals considered by the second-stage adder. The second-stage totals are sent to a third-stage adder that receives all of the second-stage totals and outputs an indicator showing whether the buffer has available space.

DETAILED DESCRIPTION

Figure 1:
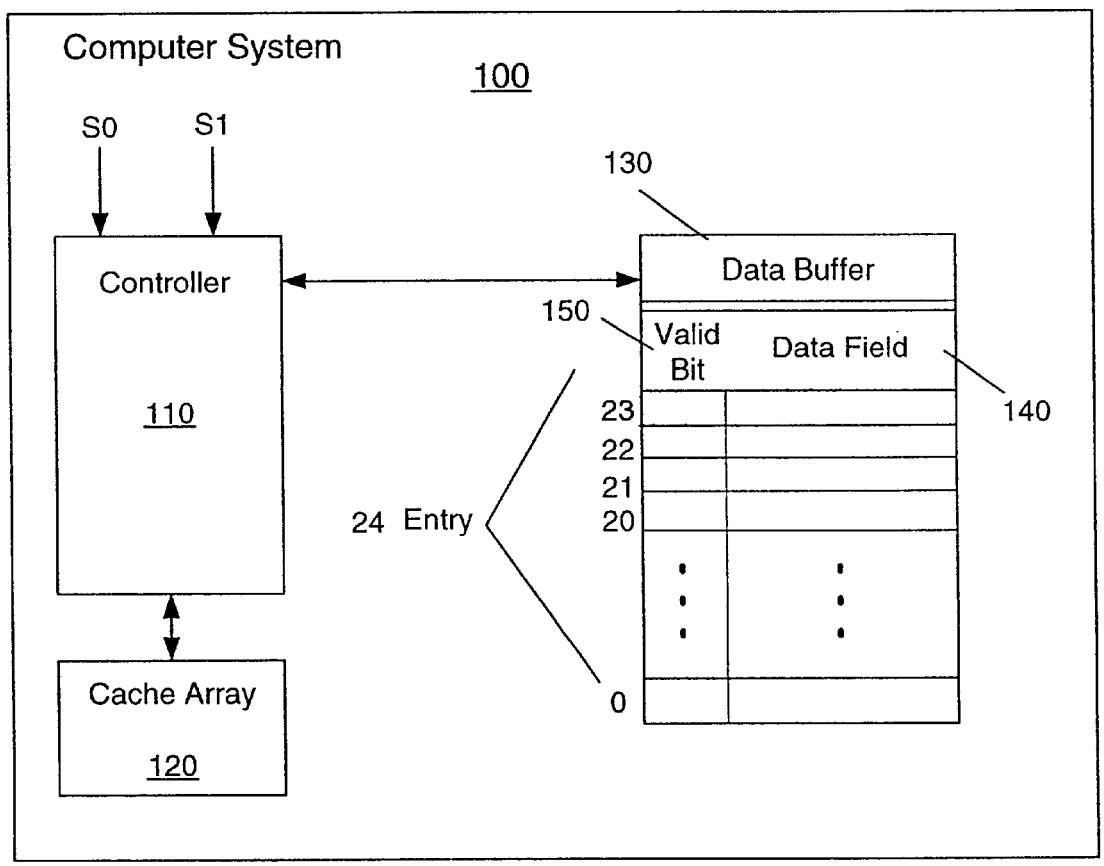
FIG. 1 shows a computer system that uses the method.

FIG. 1 shows a computer system 100 having a processor 110, also referred to herein as a controller 110, a cache array 120, and a data buffer 130. In use, the controller 110 receives data inputs S0, S1. As used herein, "data input" refers to any portion of the controller 110 capable of receiving data to be processed. The controller 110 attempts to store the data in the cache array 120 for processing. If the cache array 120 is full or otherwise inaccessible, then the controller 110 attempts to store the input data in the data buffer 130. The data buffer 130 has a plurality of entries, or slots, for storing incoming data. Entries in the data buffer 130 may be accessed randomly, in that data may be stored to any open slot rather than to slots in a particular order. For example, a data buffer 130 may use an address pointer (not shown) that sweeps through the entries to store data in a slot. In one embodiment, the data buffer 130 has a data field 140 that stores the data, and a valid bit 150 corresponding to each data entry. In one embodiment, the data buffer 130 may have 24 entries numbered 0 through 23.

When data is written to the data buffer 130, the valid bit 150 is set for the respective data field 140, indicating that data is stored in the data field 140. The controller 110 may be instructed to write only to those entries in the data buffer 130 that are empty, as indicated by a cleared valid bit 150. When space becomes available in the cache array 120, the controller 110 removes data from a data entry in the data buffer 130 and stores it to the cache array 120. When the data is removed from the data buffer 130, the valid bit 150 corresponding to the removed data is reset, indicating that the particular data entry may be overwritten.

In the embodiment shown, the controller 110 receives two data inputs S0, S1. One or both of these inputs may receive data at a given moment. Therefore, in order to receive data on the inputs S0, S1, the data buffer 130 must have at least two available entries. That is, the valid bit 150 must be reset to 0 for at least two of the entries. In the embodiment shown, the number of available entries required is referred to as the saturated count. The method and system determine whether the overflow buffer 130 has sufficient space to store incoming data by determining whether the saturated count is reached.

Figure 2:
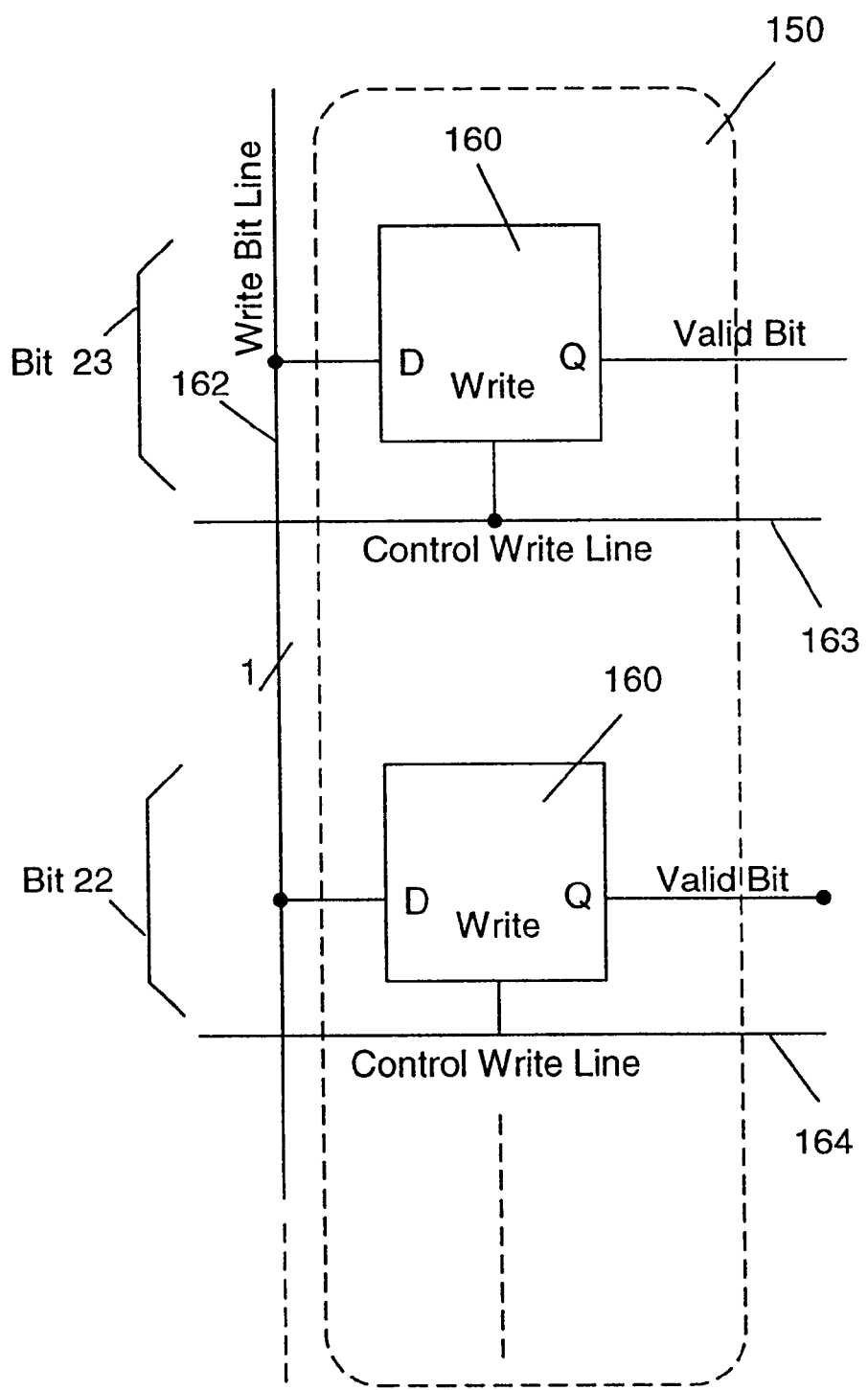
FIG. 2 shows a schematic diagram of a portion of the valid bit hardware used by the system.

FIG. 2 shows a more detailed diagram of the hardware and connections of the valid bit 150 for the data buffer 130. Each specific valid bit 150 for entries 0 through 23 may be stored using a RAM cell 160. Each RAM cell 160 has as inputs a write-bit line 162 carrying the valid bit information, and a control-write line 163, 164 that controls when the write-bit line 162 is written to the RAM cell 160. The contents of the RAM cell 160, that is the value of the valid bit 150, is shown on the Q output. As shown in FIG. 2, each data entry in the data buffer 130 has its own RAM cell 160 to hold the valid bits 150 for entries 0 through 23, for example.

Figure 3:
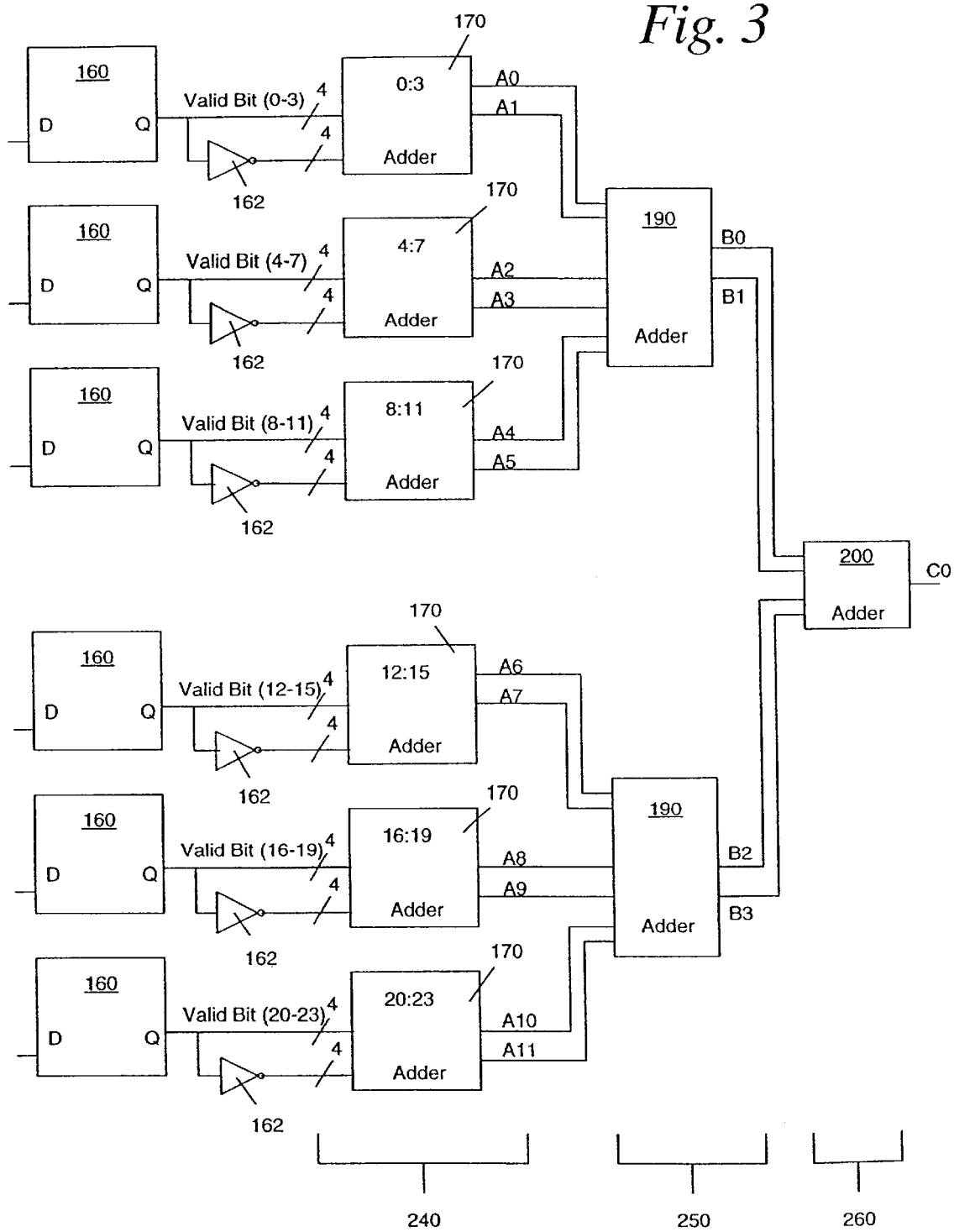
FIG. 3 shows a block diagram of the hardware used in the system.

FIG. 3 shows a block diagram of the hardware system. In the embodiment shown in FIG. 3, the system generally has three stages 240, 250, 260. The first stage 240 includes a plurality of adders/encoders 170. The terms "adder," "encoder," and "adder/encoder" are used interchangeably and refer to any device that combines inputs and gives an output. The first-stage adders 170 receive valid bits and their complements from a group (four in the example) of entries in the data buffer 130. The first-stage adder 170 adds the number of cleared valid bits in the group and encodes the group to indicate the number of available entries.

In the first stage 240, the valid bits from each of the RAM cells 160 are received by the adders 170. The adders 170 also receive the complements of the valid bits. In the example shown in FIG. 3, the first stage 240 includes six 4:1 adders 170. Valid bits for the entries in the buffer 130 are divided into groups that are processed in parallel by separate adders 170. In the example of FIG. 3, each adder 170 receives valid bits 150 from a group of four separate entries and also receives the complement of those valid bits, as indicated by the inverters 162 at the inputs of each adder 170. The adder 170 outputs a two-bit code that indicates how many of the data entries considered by the adder 170 are empty.

In the example of FIG. 3, the topmost adder 170 receives valid bits 0–3 and the complements of valid bits 0–3. These bits are received from each valid bit's respective RAM cell 160. The topmost adder 170 analyzes the valid bits for data entries 0 through 3 in the data buffer 130 and outputs a two-bit code A0, A1 to the second stage 250. In one embodiment, each first-stage adder 170 processes its group of valid bits at substantially the same time so that the second stage 250 receives outputs from each of the adders 170 in the first stage 240 at substantially the same time.

This two-bit code A0, A1 is then input into a second-stage adder/encoder 190. In the example shown in FIG. 3, each second-stage adder 190 receives six bits of data input from a group of three separate first-stage adders 170. As with the processing in the first stage 240, multiple second-stage adders 190 may process groups of first-stage outputs A0, A1 in parallel. The second-stage adder 190 outputs its own two-bit code indicating how many data entries, in the groups it considered, are available in the data buffer 130. The outputs B0, B1 of the second-stage adders 190 are then input into a third-stage adder/encoder 200. In the example of FIG. 3, the third-stage adder 200 receives four bits of encoded data from a group of two second-stage adders 190 and outputs a one-bit code, C0, indicating whether the data buffer 130 has sufficient room to store additional incoming data.

The two-bit code from the first stage 240 may be any code that indicates how many of the valid bits in the group considered by the adder 170 are not set, indicating that room is available in the data buffer 130 for those entries. One skilled in the art will recognize that various coding schemes could be used, having any number of encoded bits. As used herein, "code" refers to any system or scheme capable of indicating how many of the selected entries are available or unavailable for receiving data. "Indicating" is meant in the broadest sense and includes, for example, either indicating a particular value for some or all of the entries in the buffer or indicating whether a particular saturated count or other condition is reached. In one embodiment using a saturated count of two, the system may use the following coding for [A1,A0]: [0,1] indicates that there are no available entries in the group received by the adder 170, 190; [1,0] indicates that there is one available entry in the group; [0,0] indicates that there is more than one available entry in the group, and that the saturated count is reached.

This embodiment of the coding allows each stage 240, 250, 260 of the system to use substantially the same hardware design. Also, this embodiment uses a low indicator [0,0] to indicate that the particular output of one of the first-stage or second-stage adders 170, 190 has reached the saturated count. If any one of the first-stage adders 170 or second-stage adders 190 reaches the saturated count, then the system knows that CO will indicate available space in the buffer 130 regardless of the results from the other first-stage and second-stage adders 170, 190.

In the specific embodiments described herein, dynamic n-type MOSFETs are used to add and encode the results in each of the adders/encoders 170, 190, 200, and p-type MOSFETs are used to pre-charge the adders/encoders 170, 190, 200. As used herein, the term "pre-charged state" refers to a state of any hardware before processing inputs. For example, if the PFETS pre-charge the first-stage outputs [A1,A0] to [0,0], then [0,0] is the pre-charged state for the first-stage adder 170. In these particular embodiments, the low indicator [0,0] for the saturated count corresponds a pre-charged state of the adder 170. This enables the adders/encoders 170, 190, 200 to process the information more quickly and easily when the saturation count is reached, because the MOSFETs in the adders/encoders 170, 190, 200 do not have to transition from their pre-charged states. One skilled in the art will recognize that various pre-charged states may exist, and that, in other embodiments, other coding schemes may be used to correlate a saturation count output from a first-stage adder 170 or second-stage adder 190 to the pre-charged state. For example, the adders/encoders 170, 190, 200 may comprise various combinations of NFETS and PFETS, and may use various codes to correlate a saturated count with a pre-charged state. In still other embodiments, the system may not correlate a saturation count with the pre-charged state.

In the example of FIG. 3, the system is implemented to detect whether two or more entries are available in the data buffer 130, so the output, C0, may be a single bit that indicates whether or not two or more entries are available. In this example, the saturated count is two; that is, the system determines whether two or more entries are available because the example is configured to receive two inputs of data S0, S1. In other embodiments, the system may specify the number of available entries using an output having multiple bits, or may use a single bit to indicate whether or not a different saturated count is reached.

In one embodiment, the system determines whether or not the buffer 130 currently has reached the saturated count and has sufficient space to accept incoming data. The computer system 100 may be controlled by a clock (not shown). Data received by the controller 110 on the inputs S0, S1 may be received once during each clock cycle. In this embodiment, the system may process all of the valid bits for the buffer 130 through the multiple phases 240, 250, 260 during a single clock cycle or during a single phase of a clock cycle. This improves efficiency of the system because the output C0 reflects the current availability in the buffer 130, rather than its availability during a previous clock cycle. By so doing, the method and system for determining availability does not slow the input of data to the controller 110 on the inputs S0, S1, and does not require other methods or systems for determining whether the output CO reflects the current status of the buffer 130.

Figure 4:
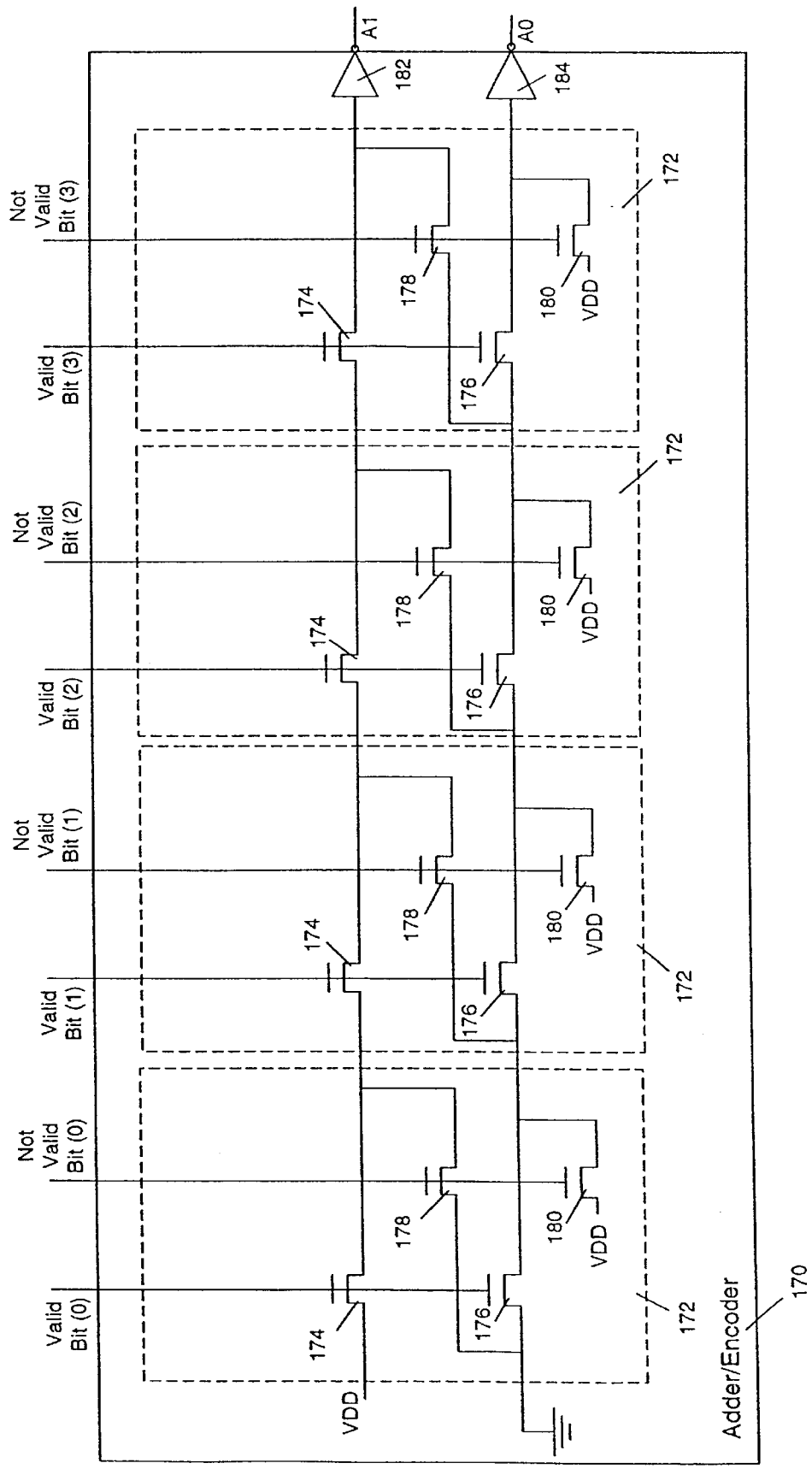
FIG. 4 shows a schematic diagram of the first stage of the system hardware.

FIG. 4 shows a schematic diagram of the first-stage adder/encoder 170 shown in FIG. 3. The first-stage adder 170 receives four valid bit inputs 0–3, and their complements, shown as not-valid bits 0–3. The first-stage adder/encoder 170 outputs two-bit data on lines A0, A1. In the example shown in FIG. 4, the first-stage adder/encoder 170 may be further broken down into four bit-processing blocks 172. Each block 172 includes a plurality of n-type MOSFETs 174, 176, 178, 180. These transistors 174, 176, 178, 180, are connected directly or indirectly to ground or to a voltage source VDD and have either the valid bits or their complements as their gate inputs. The MOSFETs 174, 176, 178, 180 are designed to encode the output A1, A0 to reflect the coding scheme described above. One skilled in the art will recognize that various coding schemes and various hardware configurations may be used to achieve the same result. In the embodiment shown in FIG. 4, the first-stage adder/encoder 170 has inverters 182, 184 near the output A1, A0 to provide the desired encoding.

Figure 5:
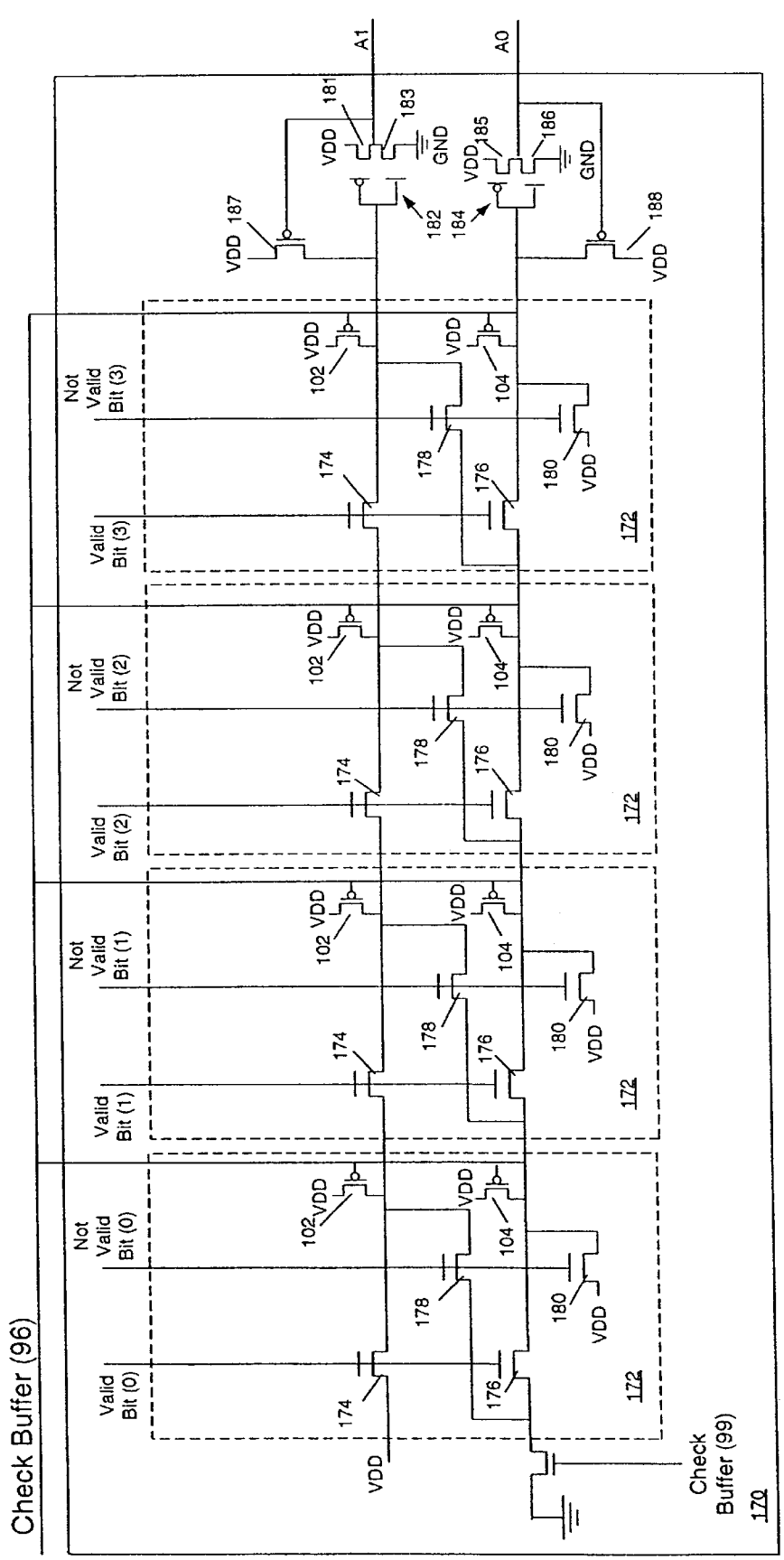
FIG. 5 shows a more detailed diagram of one embodiment of the hardware of FIG. 4.

FIG. 5 shows a more detailed schematic of the schematic shown in FIG. 4. In the embodiment of FIG. 5, the first-stage adder/encoder 170 may be set to a pre-charged state using a check-buffer signal 96 as an input to control when the overflow buffer 130 is analyzed for available space. The check-buffer signal 96 controls gates on an n-type MOSFET 106 connected to ground, and p-type MOSFETs 102, 104 in each valid-bit-processing block 172. The inverters 182, 184 are shown in greater detail in the embodiment of FIG. 5, comprising a p-type MOSFET 181, 185, and an n-type MOSFET 183, 186. In one embodiment, p-type MOSFETs 187, 188 may also be used to control feedback of the inverters 182, 184. In the embodiment shown in FIG. 5, the pre-charged state gives an output [A1,A0] of [0,0], which corresponds to the code for a saturated count.

Figure 6:
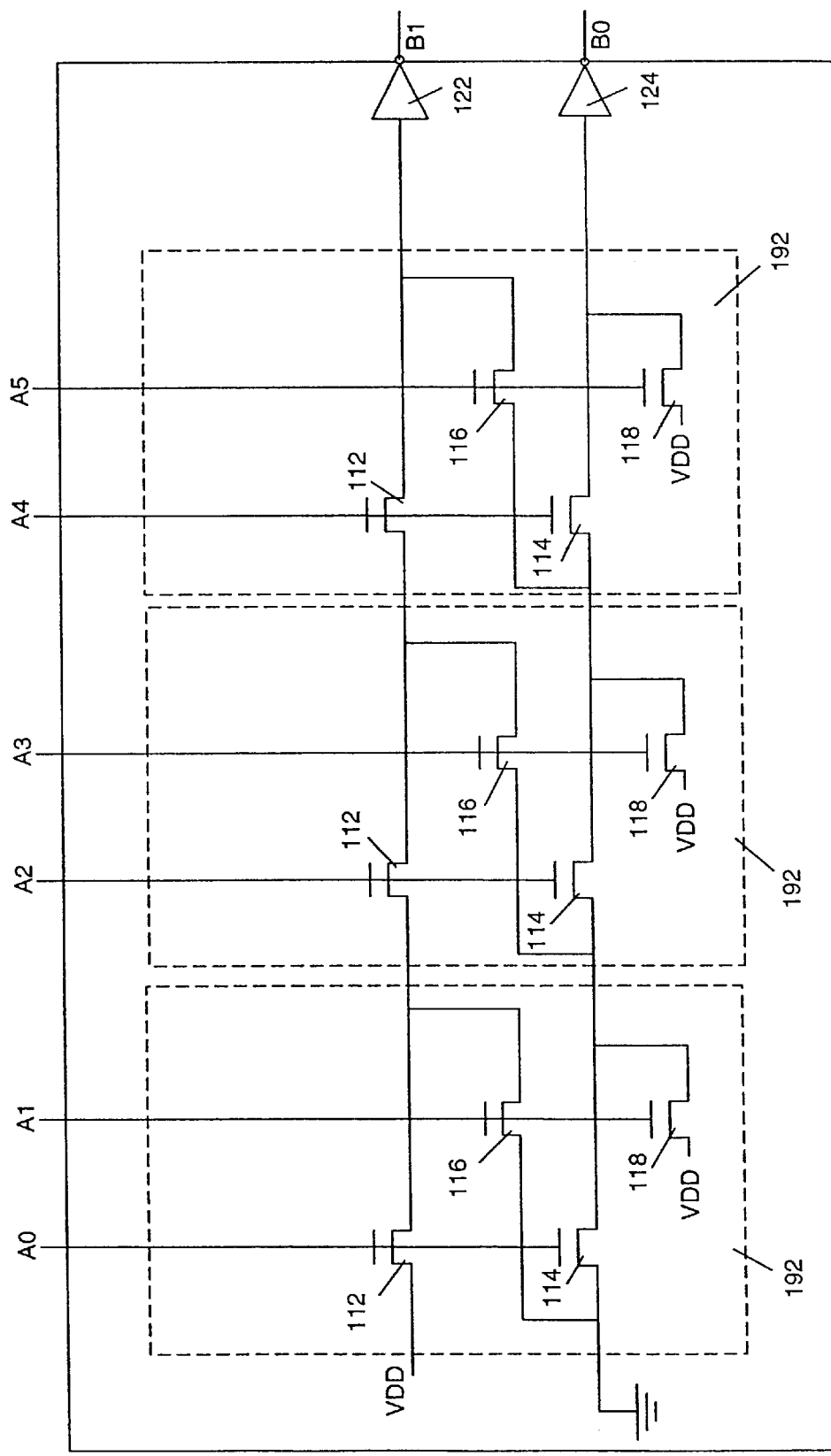
FIG. 6 shows a schematic diagram of the second stage of the hardware used by the system.

FIG. 6 shows an embodiment of a second-stage adder/encoder 190. The second-stage adder/encoder 190 receives six inputs from three first-stage adder/encoders 170. The inputs are shown in FIG. 6 as A0, A1, A2, A3, A4, A5. The second-stage adder 190 outputs a two-bit code on outputs B1, B0. The second-stage adder 190 includes three separate processing blocks 192, each of which handles two signals coming from the output of a single first-stage adder 170. Each processing block 192 may comprise n-type MOSFETs 112, 114, 116, 118 connected directly or indirectly to ground or to a voltage source, VDD. The incoming encoded signals A0, A1 control gates on the n-type MOSFETs 112, 114, 116, 118. As with the first-stage adder/encoder 170, the second-stage adder/encoder 190 is designed to encode its outputs B0, B1 according to a defined coding scheme that indicates whether zero, one, or more than one entry is available in the overflow buffer 130. In the embodiment shown in FIG. 6, inverters 122, 124 are used to create the desired coding for the outputs B0, B1.

Figure 7:
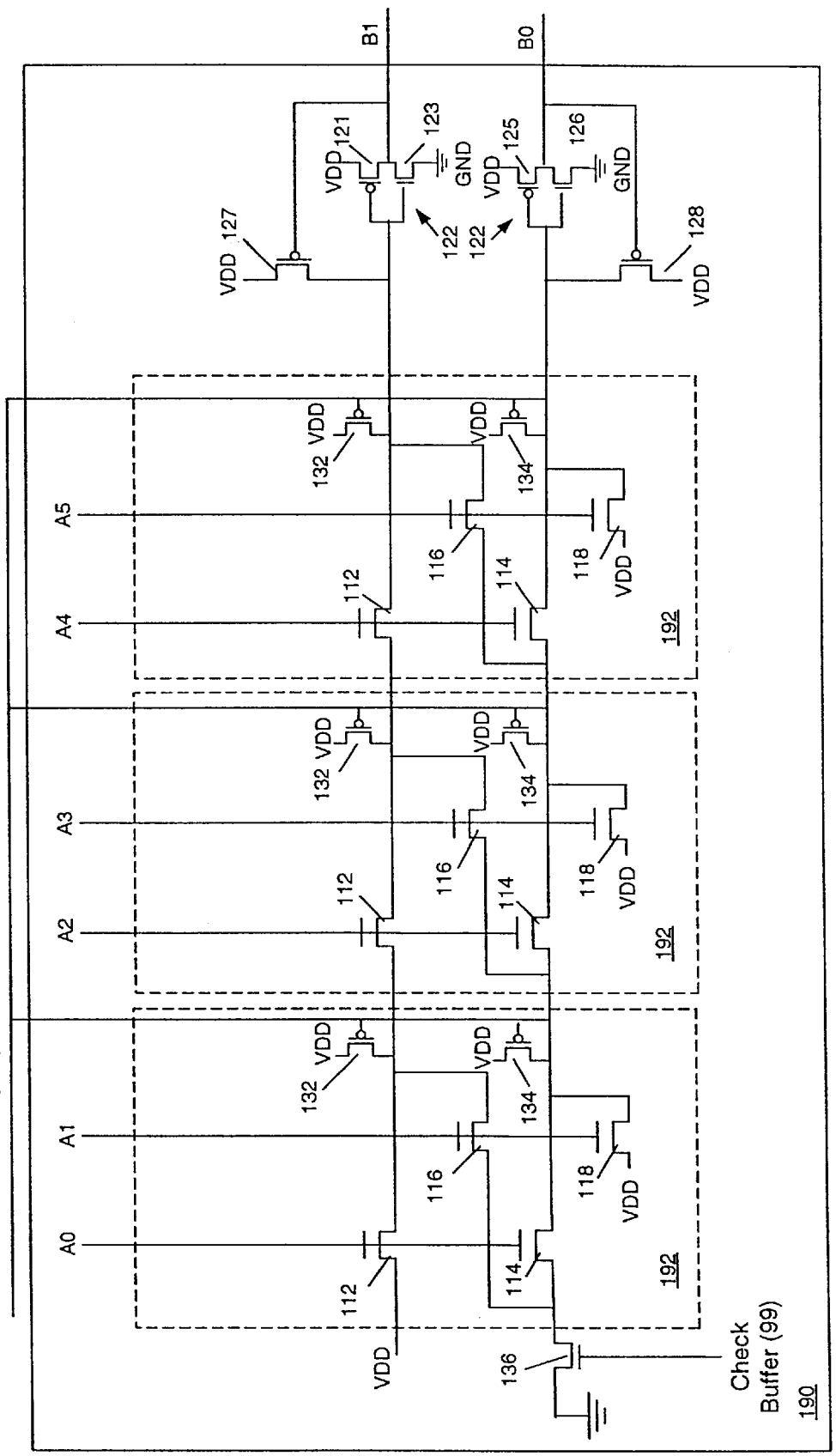
FIG. 7 shows a more detailed schematic diagram of the hardware shown in FIG. 6.

FIG. 7 shows a more detailed schematic diagram of one embodiment of the second-stage adder/encoder 190 shown in FIG. 6. Like the embodiment of the first-stage adder/encoder 170 shown in FIG. 5, the embodiment shown in FIG. 7 for the second-stage adder/encoder 190 includes an input from a check-buffer signal 97, which controls the gates of p-type MOSFETs 132, 134 such that the system may be set to a pre-charged state. The embodiment in FIG. 7 also includes an n-type MOSFET 136 connected ground, and also has the check-buffer signal 97 as its gate input to allow the adder/encoder 190 to be pre-charged. The inverters 122, 124 are shown in greater detail having p-type MOSFETs 121, 125 and n-type MOSFETs 123, 126. They also include p-type MOSFETs 127, 128 to control feedback on the inverters.

In the embodiment shown in FIGS. 4 through 7, the hardware used is substantially the same to simplify the coding system and to speed processing. Also, in the embodiment shown in FIGS. 4 through 7, the first-stage 240 uses adders 170 that receive the actual valid bits and their complements, four at a time. In the second-stage 250, the adders 190 receive as inputs the outputs of the first-stage adders 170, rather than the actual valid bits and their complements. The second-stage adders 190 also receive only three pairs of these inputs. One skilled in the art will recognize that other combinations of circuit elements will yield the same result. One skilled in the art will also recognize that various coding schemes may be used as desired.

Figure 8:
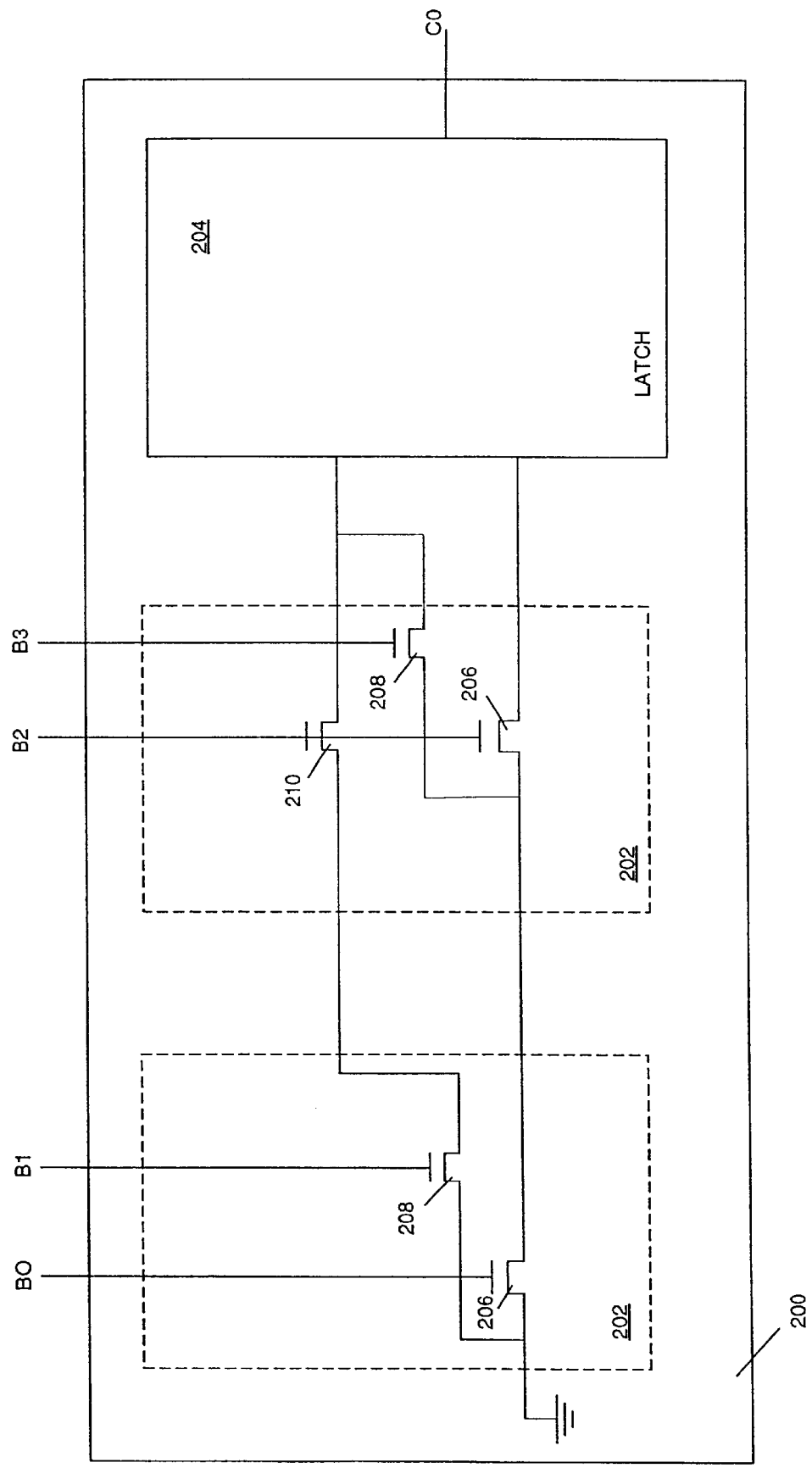
FIG. 8 shows a schematic diagram of the third stage of the hardware used by the system.

FIG. 8 shows a block diagram of the third-stage adder/encoder 200. In the embodiment shown in FIG. 8, the third-stage adder/encoder 200 receives two sets of inputs B0, B1, B2, B3 from two separate second-stage adders 190. The third-stage adder/encoder 200 outputs a signal C0 indicating whether the overflow buffer 130 has room to accept two more data entries, or whether room does not exist. In the example of FIG. 8, the output signal C0 is a one-bit code indicating whether or not the buffer 130 has room for two more entries. That is, it indicates whether the saturated count is reached. The third-stage adder/encoder 200 comprises two processing blocks 202, each of which receives two inputs from the second-stage adder 190 outputs. In the example shown in FIG. 8, each processing block 202 comprises two n-type MOSFETs 206, 208 connected directly or indirectly to ground or a voltage source, VDD. One of the logic blocks 202 also comprises a third n-type MOSFET 210, which is also controlled by one of the inputs, B2. The third-stage adder/encoder 200 also comprises a latch 204. The latch 204 is used to control the output of the signal C0.

Figure 9:
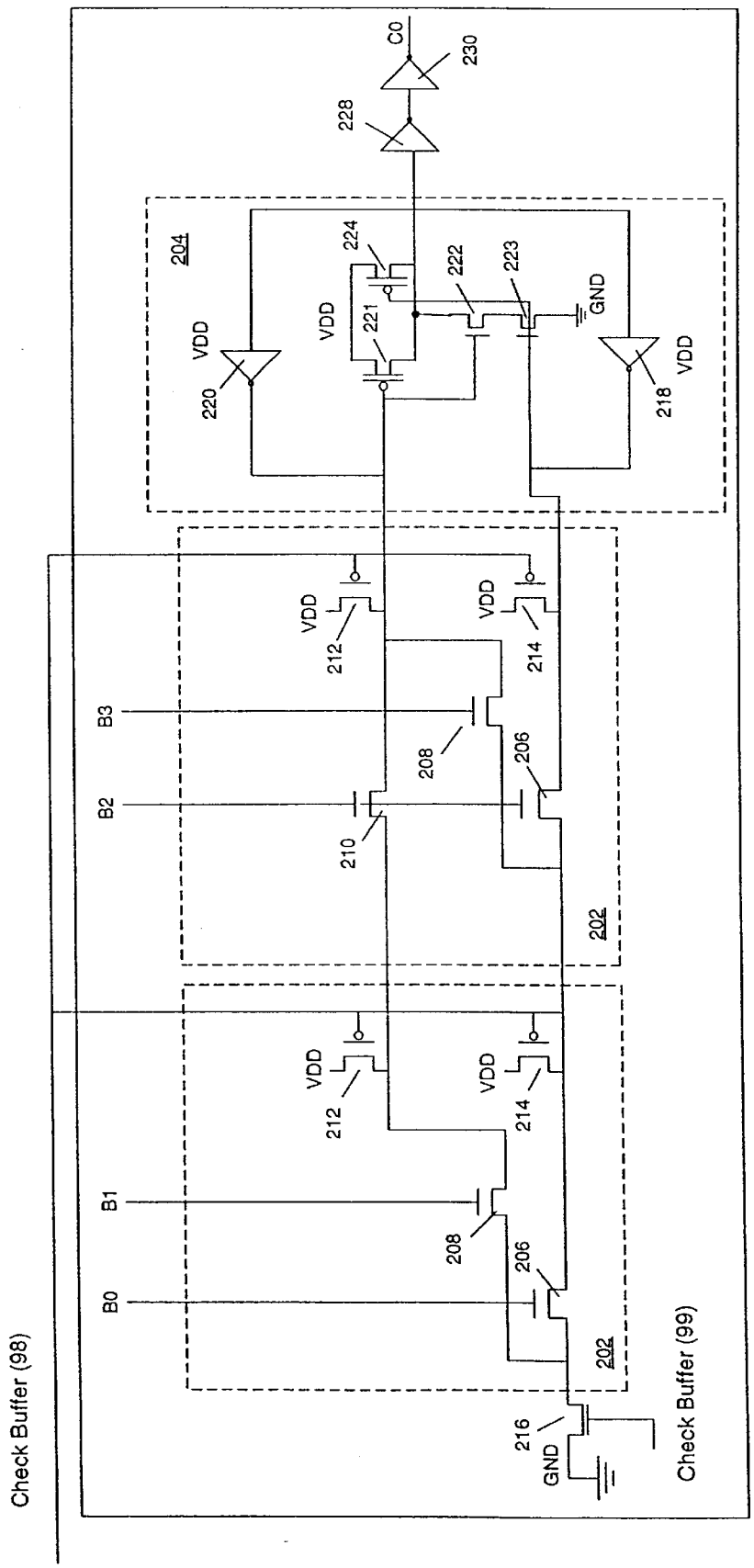
FIG. 9 shows a more detailed schematic diagram of the hardware shown in FIG. 8.

FIG. 9 shows a more detailed schematic diagram of the embodiment shown in FIG. 8. The embodiment shown in FIG. 9 also uses a check-buffer signals 98, 99 to control the pre-charging of the logic circuitry. In one embodiment, separate check-buffer signals 98, 99 are used to control gates on p-type MOSFETs 212, 214 located in the individual logic portions 202 and to control the signal to ground using an n-type MOSFET 216. The check-buffer signals 98, 99 may be specialized signals that enable latching of the result by delaying reset of the dynamic gates 206, 208, 210 for one full cycle of a system clock. FIG. 9 shows further detail of one embodiment of a latch 204. The latch 204 in FIG. 9 comprises p-type MOSFETs 221, 224 and n-type MOSFETs 222, 223, 225, 226. The latch may also include inverters 218, 220 to control feedback. In the embodiment shown in FIG. 9, the third-stage adder/encoder 200 also includes two output inverters 228, 230 to maintain integrity of the output signal C0.

Figure 10:
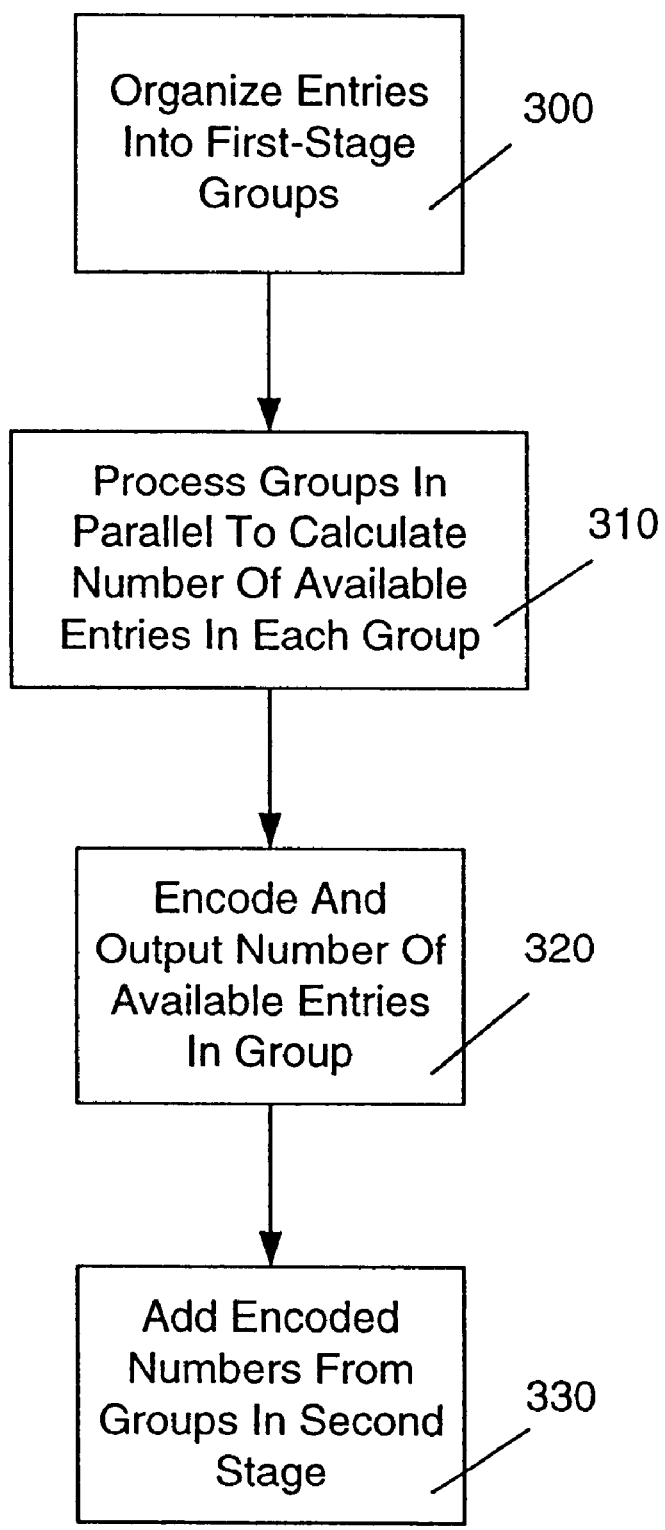
FIG. 10 shows a flow chart of the method used by the system.

FIG. 10 shows a flow chart of the method used by the system to determine whether the overflow buffer 130 has sufficient space to accept new entries. Buffer entries are organized 300 into a plurality of groups. A first-stage adder/encoder 170 receives valid bits corresponding to entries in a particular group. Multiple first-stage adders 170 are used to process 310 a plurality of groups in parallel. Using the valid bits received for its group, each adder 170 determines how many entries within its group are available. By dividing 300 the valid bits into groups and calculating 310 in parallel sums of available entries in each group, the system determines how many entries are available more quickly than traditional methods, such as the ripple adder. Each first-stage adder 170 then encodes 320 the number of available entries in its group, and outputs 320 the code to a second stage 250 that combines 330 the results from each of the groups as determined by the first-stage adders 170. The multiple-stage, parallel processing system may be extrapolated to systems involving multiple stages, in which adders 170, 190, 200 process groups and subgroups of entries in parallel.

Figure 11:
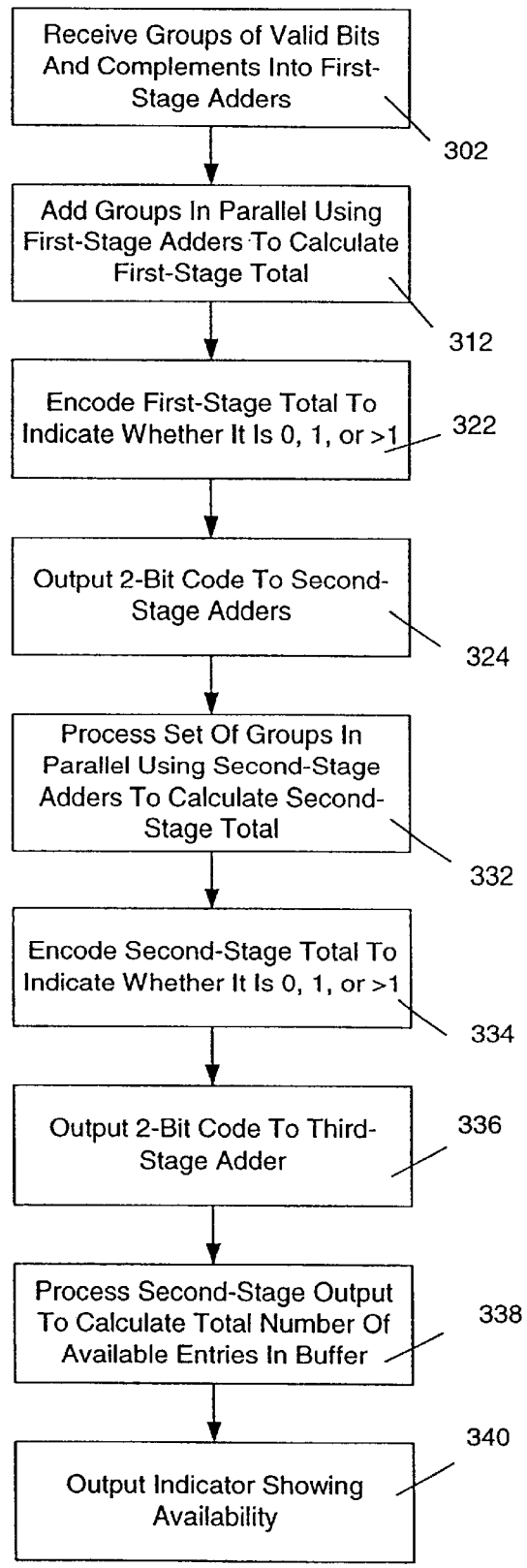
FIG. 11 shows a more detailed flow chart of one embodiment of the method of FIG. 10.

FIG. 11 shows a more detailed flow chart of FIG. 10 for an embodiment of the method as implemented for the hardware system of FIGS. 1–9, in which the buffer 130 has 24 entries and the controller 110 has two inputs S0, S1, wherein it is desirable to know whether two or more entries are available in the buffer 130. As noted in FIG. 10, the entries are organized 300 into groups. For each of these groups, valid bits for their entries and complements of the valid bits are received 302 into a first-stage adder 170. Within each group, the not-valid bits are added 312 to calculate a first-stage total, which represents the number of available entries within the group considered by the first-stage adder 170. Because the system in this embodiment is concerned with whether the buffer 130 can accept data for two additional entries, the first-stage total is then encoded 322 to indicate whether, within the first-stage group, there are zero, one, or more than one entries available.

The two-bit code is then output 324 to a second stage 250 of adders 190. Like the first-stage adders 170, the second-stage adders 190 receive inputs from groups of entries, in this case groups of codes of first-stage totals. That is, each second-stage adder 190 receives sets of two-bit inputs from multiple first-stage adders 170. Also like the first-stage adders 170, a plurality of second-stage adders 190 process 332 the entry information in parallel as part of the encoding and outputting step 320 shown in FIG. 10. The second-stage adders 190 compute the second-stage total, which is the total number of available entries in the groups considered by the second-stage adder 190. As another part of the encoding and outputting step 320, the second-stage total is encoded 334 to indicate whether the second-stage total is zero, one, or more than one, and that code is output 336 to a third-stage adder/encoder 200, that adds 338 second-stage totals from a plurality of second-stage adders 190 and outputs 340 an indicator showing whether the buffer 130 has sufficient room to receive two more entries.

Although the present invention has been described with respect to particular embodiments thereof, variations are possible. The present invention may be embodied in specific forms without departing from the essential spirit or attributes thereof. In addition, although specific circuits have been shown for implementing the invention, one skilled in the art will recognize that the invention may be created using various types of circuit designs, and although the invention is shown in one embodiment having three stages, one skilled in the art will recognize that various numbers of stages may be used to create the invention. It is desired that the embodiments described herein be considered in all respects illustrative and not restrictive and that reference be made to the appended claims and their equivalents for determining the scope of the invention.

We claim:

1. A computer hardware system for determining space availability in an overflow buffer having a plurality of entries having valid bits, the system comprising:

a first-stage adder that receives information, during a single clock cycle, indicating how many of a first group of entries in an overflow buffer are available to receive data and outputs an encoded first-stage total indicating how many entries in the first group are available to receive data; and a second-stage adder that combines, during the single clock cycle, the encoded first-stage total of the first group with a first-stage total of a second group to determine how many of the entries are available to receive data.

2. The system of claim 1, wherein the information received by the first-stage adder comprises a valid bit associated with an entry in the buffer.

3. The system of claim 1, wherein the information received by the first-stage adder comprises a valid bit associated with an entry in the buffer and a complement of the valid bit.

4. The system of claim 1, wherein the information received by the first-stage adder comprises a plurality of valid bits and complements, associated with a plurality of entries in the buffer.

5. The system of claim 1, wherein the first-stage adder outputs an encoded first-stage total using a coding system that correlates a saturated count of the information received by the first-stage adder with a pre-charged state of the first-stage adder.

6. The system of claim 1, wherein the second-stage adder outputs a second-stage total indicating a number of available entries in groups considered by the second-stage adder.

7. The system of claim 6, further comprising a third-stage adder that receives a plurality of second-stage totals from second-stage adders and outputs a third-stage code, during the single clock cycle, indicating a number of available entries in groups of entries considered by the third-stage adder.

8. The system of claim 7, wherein the second stage outputs an encoded second-stage total using a coding system that correlates a saturated count of information received by the second-stage adder with a pre-charged state of the second-stage adder.

9. A computer hardware system comprising:

a first stage comprising a plurality of first-stage adders, each of which receives information for a group of entries in an overflow buffer indicating whether entries in the group are available to receive data, and outputs a first-stage code indicating how many of the group of entries is available; and a second stage comprising a second-stage adder that receives the first-stage codes from a plurality of first-stage adders, determines a number of available entries in the buffer based on the plurality of first-stage codes, and outputs a second-stage code, wherein the first-stage code correlates a saturated count of the information received by the first-stage adder with a pre-charged state of the first-stage adder.

10. The system of claim 9, wherein each of the plurality of first-stage adders receives information for its respective group at substantially the same time, whereby the first-stage adders process the information in parallel.

11. The system of claim 9, wherein the second-stage code indicates a total number of available entries in the buffer by outputting a code that indicates whether the saturated count is reached.

12. The system of claim 9, wherein the first-stage code is a two-bit code that indicates whether zero, one, or two or more entries in the group considered by the first-stage adder are available to receive data.

13. The system of claim 9, further comprising a third stage comprising a third-stage adder that receives the second-stage codes from a plurality of second-stage adders, determines a number of available entries in the buffer based on the second-stage codes, and indicates whether the buffer has available entries.

14. The system of claim 13, wherein the third stage comprises one third-stage adder that receives the second-stage codes from all of the second-stage adders, and indicates how many entries are available using an output bit to indicate whether the buffer can accept additional data, and wherein the first, second, and third stages process the information and determine buffer availability during a single clock cycle.

15. A method of determining whether a data buffer has room to store additional data, the method comprising:

organizing a plurality of entries in a data buffer into a plurality of first-stage groups;

processing the groups in parallel in a first stage using first-stage encoders, wherein each first-stage encoder is associated with a group, the step of processing comprising:

receiving in each of the first-stage encoders information for the entries in the first-stage group corresponding to the first-stage encoder;

determining a first-stage total for each group, which first-stage total indicates how many entries are available within each first-stage group; and adding the first-stage totals in a second stage to determine a second-stage total, wherein the steps of processing and adding occur during a single cycle of a clock.

16. The method of claim 15, wherein the step of adding comprises adding all of the first-stage totals, wherein the second-stage total indicates the number of available entries in the buffer.

17. The method of claim 15, wherein the step of processing further comprises encoding the first-stage totals, using a coding system that correlates a saturated count of the first-stage total with a pre-charged state of at least one of the first-stage encoders.

18. The method of claim 15, further comprising adding a plurality of second-stage totals in a third stage to determine whether the buffer can accept additional data.

19. The method of claim 15, wherein the step of processing comprises processing the groups in parallel using a plurality of first-stage encoders, each of which receives information from one first-stage group.

20. The method of claim 15, wherein the method is used to determine whether the buffer has two available entries, and wherein the step of encoding comprises using a two-bit code to indicate whether the buffer has zero, one, or more than one available entry.

* * * * *